US012176616B2

(12) United States Patent
Agnihotri et al.

(10) Patent No.: US 12,176,616 B2
(45) Date of Patent: Dec. 24, 2024

(54) DUAL BEAM LAUNCHER

(71) Applicant: Kymeta Corporation, Redmond, WA (US)

(72) Inventors: Ila Agnihotri, Redmond, WA (US); Mohsen Sazegar, Redmond, WA (US)

(73) Assignee: KYMETA CORPORATION, Redmond, WA (US)

(*) Notice: Subject to any disclaimer, the term of this patent is extended or adjusted under 35 U.S.C. 154(b) by 178 days.

(21) Appl. No.: 17/884,389

(22) Filed: Aug. 9, 2022

(65) Prior Publication Data

US 2023/0049049 A1 Feb. 16, 2023

Related U.S. Application Data

(60) Provisional application No. 63/233,062, filed on Aug. 13, 2021.

(51) Int. Cl.
*H01Q 21/00* (2006.01)

(52) U.S. Cl.
CPC ................................ *H01Q 21/0012* (2013.01)

(58) Field of Classification Search
CPC .................................................. H01Q 21/0012
See application file for complete search history.

(56) References Cited

U.S. PATENT DOCUMENTS 2,908,001 A * 10/1959 Kelly ..................... H01Q 21/20 343/756
2,981,949 A * 4/1961 Elliott .................... H01Q 13/20 343/762
3,086,205 A * 4/1963 Berkowitz ............... H01Q 3/12 343/754
3,281,843 A * 10/1966 Plummer .................. G01S 1/02 343/773
5,194,876 A * 3/1993 Schnetzer .............. H01Q 21/30 343/769

(Continued)

FOREIGN PATENT DOCUMENTS

EP 4250486 A1 * 9/2023 ........... H01Q 13/103
GB 2616848 A * 9/2023 ........... H01Q 1/2283

(Continued)

OTHER PUBLICATIONS

International Search Report and Written Opinion on the Patentability of Application PCT/US2022/040345 Mailed Dec. 6, 2022, 10 pages.

(Continued)

*Primary Examiner* — Ricardo I Magallanes
*Assistant Examiner* — Jordan E. DeWitt
(74) *Attorney, Agent, or Firm* — Womble Bond Dickinson (US) LLP

(57) ABSTRACT

Antennas having a multi-beam (e.g., dual beam, etc.) launcher and methods for using the same are described. In some embodiments, the antenna comprises: an array of antenna elements; two parallel plate waveguides coupled to the array of antenna elements, the two parallel plate waveguides sharing a common radial plane and arranged in a stacked configuration; and a dual feed launcher to launch first and second TEM waves into the two parallel plate waveguides, the first and second TEM waves being different and being simultaneously launched in the two parallel plate waveguides.

20 Claims, 11 Drawing Sheets

(56) References Cited

U.S. PATENT DOCUMENTS

| | | | | | |
|---|---|---|---|---|---|
| 5,256,988 | A * | 10/1993 | Izadian | H03F 3/602 | 333/34 |
| 6,101,705 | A * | 8/2000 | Wolfson | H01P 11/002 | 29/600 |
| 6,396,440 | B1 * | 5/2002 | Chen | H01Q 3/26 | 343/768 |
| 8,773,319 | B1 * | 7/2014 | Anderson | H01Q 19/193 | 343/705 |
| 9,716,309 | B1 * | 7/2017 | ElSallal | H01Q 13/085 | |
| 10,128,931 | B2 * | 11/2018 | Rothaar | H04B 7/0604 | |
| 10,135,113 | B2 * | 11/2018 | Fotheringham | H04B 7/18515 | |
| 10,797,408 | B1 * | 10/2020 | Boutayeb | H01Q 1/2291 | |
| 10,950,927 | B1 * | 3/2021 | West | H01Q 1/364 | |
| 11,799,211 | B2 * | 10/2023 | Sazegar | H01Q 21/0037 | |
| 2002/0075194 | A1 * | 6/2002 | Sikina | H01Q 21/064 | 343/757 |
| 2003/0011522 | A1 * | 1/2003 | McKinzie, III | H01Q 15/008 | 343/700 MS |
| 2007/0045242 | A1 * | 3/2007 | Goto | H01J 37/32192 | 219/121.43 |
| 2007/0107103 | A1 * | 5/2007 | Kempa | B82Y 20/00 | 136/243 |
| 2010/0073232 | A1 * | 3/2010 | Sajuyigbe | H01Q 15/006 | 342/372 |
| 2012/0194400 | A1 * | 8/2012 | Brasile | H01Q 21/067 | 343/776 |
| 2014/0138546 | A1 * | 5/2014 | Iluz | G01J 1/02 | 250/493.1 |
| 2015/0123864 | A1 * | 5/2015 | Boryssenko | H01Q 21/062 | 343/816 |
| 2015/0236412 | A1 * | 8/2015 | Bily | H01Q 21/0031 | 343/731 |
| 2017/0025751 | A1 * | 1/2017 | White | H01Q 19/138 | |
| 2017/0254903 | A1 * | 9/2017 | Johnson | G01S 3/42 | |
| 2017/0256865 | A1 * | 9/2017 | Sikes | H01Q 13/10 | |
| 2018/0123260 | A1 * | 5/2018 | Sikes | H01Q 15/0053 | |
| 2018/0131103 | A1 * | 5/2018 | Bily | H01Q 21/28 | |
| 2018/0323490 | A1 * | 11/2018 | Harp | H01Q 1/405 | |
| 2019/0089065 | A1 * | 3/2019 | Sikes | H01Q 21/005 | |
| 2019/0103681 | A1 * | 4/2019 | Slota | H01Q 15/141 | |
| 2019/0148820 | A1 * | 5/2019 | Biedscheid | H01Q 21/064 | 343/708 |
| 2020/0044326 | A1 * | 2/2020 | Olfert | H01Q 21/061 | |
| 2020/0161777 | A1 * | 5/2020 | Boutayeb | H01Q 25/00 | |
| 2020/0203849 | A1 * | 6/2020 | Lim | H01P 5/12 | |
| 2020/0287297 | A1 * | 9/2020 | Boutayeb | H01Q 1/36 | |
| 2021/0167522 | A1 * | 6/2021 | Boutayeb | G02B 27/0955 | |
| 2022/0328965 | A1 * | 10/2022 | Chalabi | H01Q 21/0012 | |
| 2023/0049049 | A1 * | 2/2023 | Agnihotri | H01Q 21/0012 | |
| 2023/0238697 | A1 * | 7/2023 | Varel | H01Q 21/0031 | 342/372 |

FOREIGN PATENT DOCUMENTS

| | | | | | |
|---|---|---|---|---|---|
| JP | H0774537 | A * | 3/1995 | | |
| KR | 1020170117196 | A | 10/2017 | | |
| WO | WO-9117586 | A * | 11/1991 | H01Q 13/20 | |
| WO | WO-2022212661 | A1 * | 10/2022 | H01Q 15/0086 | |

OTHER PUBLICATIONS

International Preliminary Report on Patentability received for PCT Patent Application No. PCT/US22/40345, mailed on Feb. 22, 2024, 6 pages.

* cited by examiner

DUAL BEAM LAUNCHER

RELATED APPLICATION

The present application is a non-provisional application of and claims the benefit of U.S. Provisional Patent Application No. 63/233,062, filed Aug. 13, 2021 and entitled "Dual Beam Launcher", which is incorporated by reference in its entirety.

FIELD OF THE INVENTION

Embodiments of the invention are related to wireless communication; more particularly, embodiments of the invention are related to antennas for wireless communication that provide feed waves for interacting with radio-frequency (RF) radiating antenna elements using a hybrid of multiple feed structures.

BACKGROUND

Metasurface antennas have recently emerged as a new technology for generating steered, directive beams from a lightweight, low-cost, and planar physical platform. Such metasurface antennas have been recently used in a number of applications, such as, for example, satellite communication.

Metasurface antennas may comprise metamaterial antenna elements that can selectively couple energy from a feed wave to produce beams that may be controlled for use in communication. These antennas are capable of achieving comparable performance to phased array antennas from an inexpensive and easy-to-manufacture hardware platform.

Some previously demonstrated antenna structures have been shown to produce multiple beams at the same time. However, increasing the number of beams with similar bandwidth and directivity for simultaneous connection to different satellites comes at the expense of a required additional area footprint. In other words, the number of beams can be increased as long as the footprint of the antenna is increased in size as well.

SUMMARY

Antennas having a multi-beam (e.g., dual beam, etc.) launcher and methods for using the same are described. In some embodiments, the antenna comprises: an array of antenna elements; two parallel plate waveguides coupled to the array of antenna elements, the two parallel plate waveguides sharing a common radial plane and arranged in a stacked configuration; and a dual feed launcher to launch first and second TEM waves into the two parallel plate waveguides, the first and second TEM waves being different and being simultaneously launched in the two parallel plate waveguides.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
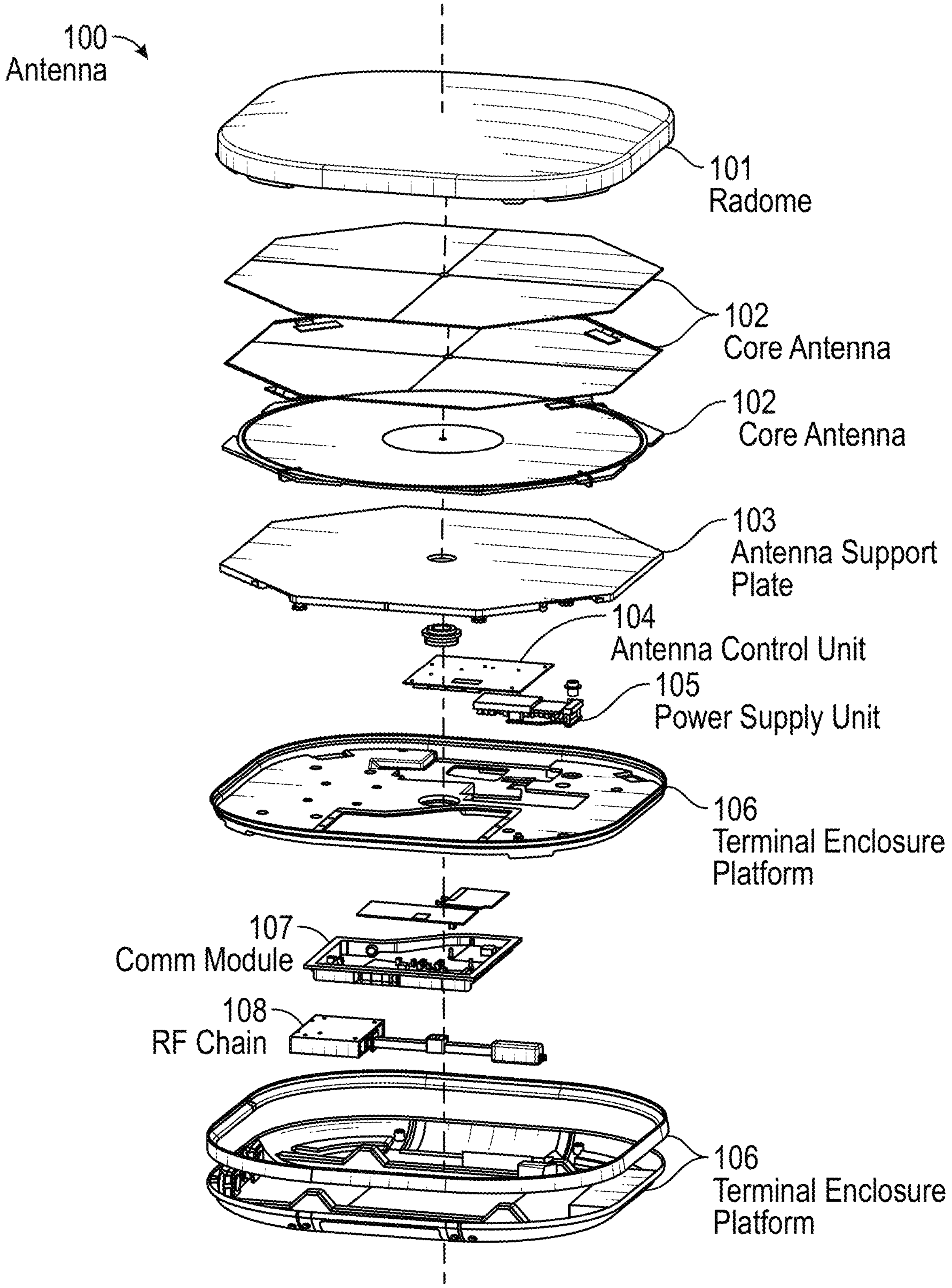
FIG. 1 illustrates an exploded view of some embodiments of a flat-panel antenna.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

An antenna having a feeding mechanism to feed multiple Transverse Electro-Magnetic ("TEM") waves to an antenna aperture and method for using the same are disclosed. In some embodiments, the feeding mechanism comprises a broadband excitation and feeding mechanism that uses concentric coaxial waveguides to launch TEM waves (e.g., radial feed waves) in parallel plate waveguides. In some embodiments, the concentric coaxial waveguides launch two TEM waves into two parallel plate waveguides sharing a common radial plane and arranged in stacked configuration. In some embodiments, the parallel plate waveguides comprise a center-fed waveguide structure and an edge-fed waveguide structure.

In some embodiments the antenna aperture is part of a leaky wave antenna and has sub-wavelength radiating slots. In some embodiments, the antenna comprises a metasurface having a plurality of metamaterial antenna elements that radiate radio-frequency (RF) energy. Such antenna elements can be surface scattering metamaterial antenna elements. Examples of such antenna elements includes liquid crystal (LC)-tuned surface scattering metamaterial antenna elements, varactor-based metamaterial antenna elements in which one or more varactor diode is used for tuning the radiating slot antenna element, etc.

Embodiments disclosed herein include a metasurface antenna with multi- (e.g., dual) beam capabilities, including the capability of receiving and transmitting simultaneously on two different, concurrent beams. The two beams can be communicably coupled to two different satellites.

In some embodiments, the antenna comprises a radiating metasurface and a feeding mechanism that can feed the metasurface concurrently with two waves travelling in opposite directions. For example, in some embodiments, two feed waves are initially injected in separate waveguides where they propagate outwardly, and then one of the feed waves is fed (e.g., edge-fed) into the waveguide in which the other feed wave is propagating so that the two feed waves are propagating in the same waveguide in opposite directions. Examples of such metasurface devices with metamaterial antenna elements (e.g., surface scattering radio-frequency (RF) radiating metamaterial antenna elements, etc.) are discussed in greater detail below. In some embodiments, these two waves will excite antenna elements that are located on the top of the radial waveguide. Due to the orthogonality of the inward-propagation and outward-propagating radial waves, the antenna elements can be tuned so that each wave will generate a beam toward a different target (e.g., its beam pointing is different). One advantage of this design is that it can give a very good level of isolation between the two channels while preserving the level of directivity and bandwidth for each beam.

In some embodiments, the metasurface antenna with capabilities to generate dual beams simultaneously is fed with feed waves from a center-fed waveguide structure and an edge-fed waveguide structure. Thus, in such embodiments, the feed is a hybrid architecture that integrates both "center-fed" and "edge-fed" feeding mechanisms. In some embodiments, the two integrated feeding mechanisms propagate radial waves moving toward the center of a waveguide for one of the feeds and toward the edge of the waveguide for the other feed. In some aspects, the two waves interact with the metasurface that is placed on top of the feed structure and they create two beams with selectable directions and polarizations.

In some embodiments, the two beams are independent from each other in their pointing angles, and the antenna can be configured to send and receive data to two satellites simultaneously without or with minimal reduction in directivity. In some embodiments, the generation of two beams is controlled so the beams can have any arbitrary combination of polarizations and/or the two beams can have any arbitrary combination of frequency within the band of operation. This results in using the same aperture and antenna elements for creation of two beams with controllable directions and polarizations that are excited by the two input feeds. In some embodiments, the antenna receives two beams simultaneously and guides them to two separate ports located at or adjacent a rear side of the antenna with a minimum interference with each other.

Furthermore, in some embodiments, the antenna does not require any additional area footprint or antenna elements for the creation of the additional beam, thereby resulting in lower size and the required hardware for creating two concurrent beams. That is, in some embodiments, the antenna achieve the simultaneous bidirectional connection to two satellites at arbitrary directions without the need to increase the aperture size or sacrificing the aperture efficiency or the bandwidth in comparison to phased array antennas that make two beams.

Examples of Antenna Embodiments

The techniques described herein may be used with a variety of flat panel satellite antennas. Embodiments of such flat panel antennas are disclosed herein. In some embodiments, the flat panel satellite antennas are part of a satellite terminal. The flat panel antennas include one or more arrays of antenna elements on an antenna aperture.

In some embodiments, the antenna aperture is a metasurface antenna aperture, such as, for example, the antenna apertures described below. In some embodiments, the antenna elements comprise radio-frequency (RF) radiating antenna elements. In some embodiments, the antenna elements include tunable devices to tune the antenna elements. Examples of such tunable devices include diodes and varactors such as, for example, described in U.S. Patent Application Publication No. 20210050671, entitled "Metasurface Antennas Manufactured with Mass Transfer Technologies," published Feb. 18, 2021. In some other embodiments, the antenna elements comprise liquid crystal (LC)-based antenna elements, such as, for example, those disclosed in U.S. Pat. No. 9,887,456, entitled "Dynamic Polarization and Coupling Control from a Steerable Cylindrically Fed Holographic Antenna", issued Feb. 6, 2018, or other RF radiating antenna elements. It should be appreciated that other tunable devices such as, for example, but not limited to, tunable capacitors, tunable capacitance dies, packaged dies, microelectromechanical systems (MEMS) devices, or other tunable capacitance devices, could be placed into an antenna aperture or elsewhere in variations on the embodiments described herein.

In some embodiments, the antenna aperture having the one or more arrays of antenna elements is comprised of multiple segments that are coupled together. In some embodiments, when coupled together, the combination of the segments form groups of antenna elements (e.g., closed concentric rings of antenna elements concentric with respect to the antenna feed, etc.). For more information on antenna segments, see U.S. Pat. No. 9,887,455, entitled "Aperture Segmentation of a Cylindrical Feed Antenna", issued Feb. 6, 2018.

FIG. 1 illustrates an exploded view of some embodiments of a flat-panel antenna. Referring to FIG. 1, antenna 100 comprises a radome 101, a core antenna 102, antenna support plate 103, antenna control unit (ACU) 104, a power supply unit 105, terminal enclosure platform 106, comm (communication) module 107, and RF chain 108.

Radome 101 is the top portion of an enclosure that encloses core antenna 102. In some embodiments, radome 101 is weatherproof and is constructed of material transparent to radio waves to enable beams generated by core antenna 102 to extend to the exterior of radome 101.

In some embodiments, core antenna 102 comprises an aperture having RF radiating antenna elements. These antenna elements act as radiators (or slot radiators). In some embodiments, the antenna elements comprise scattering metamaterial antenna elements. In some embodiments, the antenna elements comprise both Receive (Rx) and Transmit (Tx) irises, or slots, that are interleaved and distributed on the whole surface of the antenna aperture of core antenna 102. Such Rx and Tx irises may be in groups of two or more sets where each set is for a separately and simultaneously controlled band. Examples of such antenna elements with irises are described in U.S. Pat. No. 10,892,553, entitled "Broad Tunable Bandwidth Radial Line Slot Antenna", issued Jan. 12, 2021.

In some embodiments, the antenna elements comprise irises (iris openings) and the aperture antenna is used to generate a main beam shaped by using excitation from a cylindrical feed wave for radiating the iris openings through tunable elements (e.g., diodes, varactors, patch, etc.). In some embodiments, the antenna elements can be excited to radiate a horizontally or vertically polarized electric field at desired scan angles.

In some embodiments, a tunable element (e.g., diode, varactor, patch etc.) is located over each iris slot. The amount of radiated power from each antenna element is controlled by applying a voltage to the tunable element using a controller in ACU 104. Traces in core antenna 102 to each tunable element are used to provide the voltage to the tunable element. The voltage tunes or detunes the capacitance and thus the resonance frequency of individual elements to effectuate beam forming. The voltage required is dependent on the tunable element in use. Using this property, in some embodiments, the tunable element (e.g., diode, varactor, LC, etc.) integrates an on/off switch for the transmission of energy from a feed wave to the antenna element. When switched on, an antenna element emits an electromagnetic wave like an electrically small dipole antenna. Note that the teachings herein are not limited to having unit cell that operates in a binary fashion with respect to energy transmission. For example, in some embodiments in which varactors are the tunable element, there are 32 tuning levels. As another example, in some embodiments in which LC is the tunable element, there are 16 tuning levels.

A voltage between the tunable element and the slot can be modulated to tune the antenna element (e.g., the tunable resonator/slot). Adjusting the voltage varies the capacitance of a slot (e.g., the tunable resonator/slot). Accordingly, the reactance of a slot (e.g., the tunable resonator/slot) can be varied by changing the capacitance. Resonant frequency of the slot also changes according to the equation $$f = \frac{1}{2\pi\sqrt{LC}}$$

where $f$ is the resonant frequency of the slot and L and C are the inductance and capacitance of the slot, respectively. The resonant frequency of the slot affects the energy coupled from a feed wave propagating through the waveguide to the antenna elements.

In particular, the generation of a focused beam by the metamaterial array of antenna elements can be explained by the phenomenon of constructive and destructive interference, which is well known in the art. Individual electromagnetic waves sum up (constructive interference) if they have the same phase when they meet in free space to create a beam, and waves cancel each other (destructive interference) if they are in opposite phase when they meet in free space. If the slots in core antenna 102 are positioned so that each successive slot is positioned at a different distance from the excitation point of the feed wave, the scattered wave from that antenna element will have a different phase than the scattered wave of the previous slot. In some embodiments, if the slots are spaced one quarter of a wavelength apart, each slot will scatter a wave with a one fourth phase delay from the previous slot. In some embodiments, by controlling which antenna elements are turned on or off (i.e., by changing the pattern of which antenna elements are turned on and which antenna elements are turned off) or which of the multiple tuning levels is used, a different pattern of constructive and destructive interference can be produced, and the antenna can change the direction of its beam(s).

In some embodiments, core antenna 102 includes a coaxial feed that is used to provide a cylindrical wave feed via an input feed, such as, for example, described in U.S. Pat. No. 9,887,456, entitled "Dynamic Polarization and Coupling Control from a Steerable Cylindrically Fed Holographic Antenna", issued Feb. 6, 2018 or in U.S. Patent Application Publication No. 20210050671, entitled "Metasurface Antennas Manufactured with Mass Transfer Technologies," published Feb. 18, 2021. In some embodiments, the cylindrical wave feed feeds core antenna 102 from a central point with an excitation that spreads outward in a cylindrical manner from the feed point. In other words, the cylindrically fed wave is an outward travelling concentric feed wave. Even so, the shape of the cylindrical feed antenna around the cylindrical feed can be circular, square or any shape. In some other embodiments, a cylindrically fed antenna aperture creates an inward travelling feed wave. In such a case, the feed wave most naturally comes from a circular structure.

In some embodiments, the core antenna comprises multiple layers. These layers include the one or more substrate layers forming the RF radiating antenna elements. In some embodiments, these layers may also include impedance matching layers (e.g., a wide-angle impedance matching (WAIM) layer, etc.), one or more spacer layers and/or dielectric layers. Such layers are well-known in the art.

Antenna support plate 103 is coupled to core antenna 102 to provide support for core antenna 102. In some embodiments, antenna support plate 103 includes one or more waveguides and one or more antenna feeds to provide one or more feed waves to core antenna 102 for use by antenna elements of core antenna 102 to generate one or more beams.

ACU 104 is coupled to antenna support plate 103 and provides controls for antenna 100. In some embodiments, these controls include controls for drive electronics for antenna 100 and a matrix drive circuitry to control a switching array interspersed throughout the array of RF radiating antenna elements. In some embodiments, the matrix drive circuitry uses unique addresses to apply voltages onto the tunable elements of the antenna elements to drive each antenna element separately from the other antenna elements. In some embodiments, the drive electronics for ACU 104 comprise commercial off-the shelf LCD controls used in commercial television appliances that adjust the voltage for each antenna element.

More specifically, in some embodiments, ACU 104 supplies an array of voltage signals to the tunable devices of the antenna elements to create a modulation, or control, pattern. The control pattern causes the elements to be tuned to different states. In some embodiments, ACU 104 uses the control pattern to control which antenna elements are turned on or off (or which of the tuning levels is used) and at which phase and amplitude level at the frequency of operation. The elements are selectively detuned for frequency operation by voltage application. In some embodiments, multistate control is used in which various elements are turned on and off to varying levels, further approximating a sinusoidal control pattern, as opposed to a square wave (i.e., a sinusoid gray shade modulation pattern).

In some embodiments, ACU 104 also contains one or more processors executing the software to perform some of the control operations. ACU 104 may control one or more sensors (e.g., a GPS receiver, a three-axis compass, a 3-axis accelerometer, 3-axis gyro, 3-axis magnetometer, etc.) to provide location and orientation information to the processor(s). The location and orientation information may be provided to the processor(s) by other systems in the earth station and/or may not be part of the antenna system.

Antenna 100 also includes a comm (communication) module 107 and an RF chain 108. Comm module 107 includes one or more modems enabling antenna 100 to communicate with various satellites and/or cellular systems, in addition to a router that selects the appropriate network route based on metrics (e.g., quality of service (QOS)

metrics, e.g., signal strength, latency, etc.). RF chain 108 converts analog RF signals to digital form. In some embodiments, RF chain 108 comprises electronic components that may include amplifiers, filters, mixers, attenuators, and detectors.

Antenna 100 also includes power supply unit 105 to provide power to various subsystems or parts of antenna 100.

Antenna 100 also includes terminal enclosure platform 106 that forms the enclosure for the bottom of antenna 100. In some embodiments, terminal enclosure platform 106 comprises multiple parts that are coupled to other parts of antenna 100, including radome 101, to enclose core antenna 102.

Figure 2:
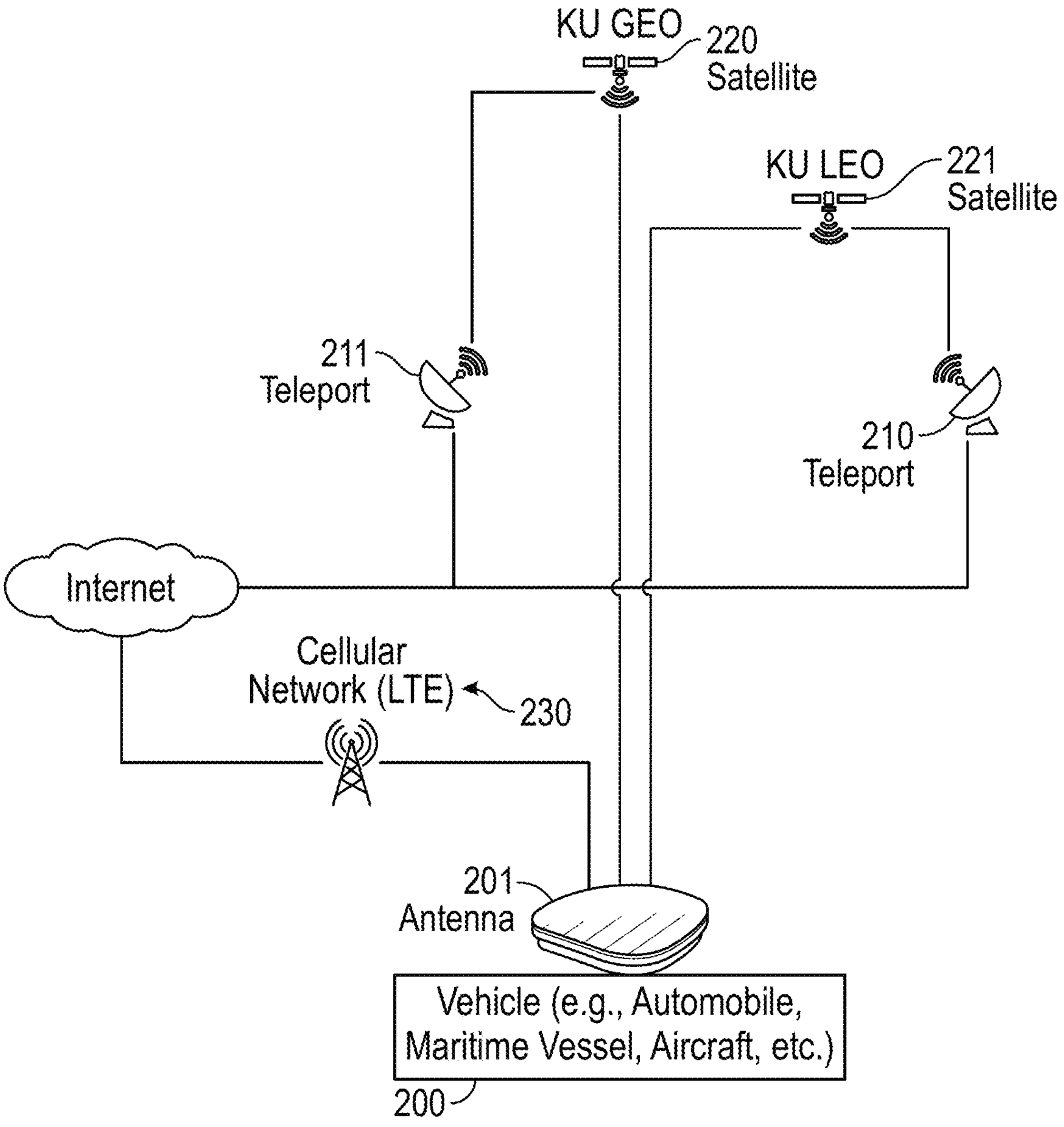
FIG. 2 illustrates an example of a communication system that includes one or more antennas described herein.

FIG. 2 illustrates an example of a communication system that includes one or more antennas described herein. Referring to FIG. 2, vehicle 200 includes an antenna 201. In some embodiments, antenna 201 comprises antenna 100 of FIG. 1.

In some embodiments, vehicle 200 may comprise any one of several vehicles, such as, for example, but not limited to, an automobile (e.g., car, truck, bus, etc.), a maritime vehicle (e.g., boat, ship, etc.), airplanes (e.g., passenger jets, military jets, small craft planes, etc.), etc. Antenna 201 may be used to communicate while vehicle 200 is either on-the-pause, or moving. Antenna 201 may be used to communicate to fixed locations as well, e.g., remote industrial sites (mining, oil, and gas) and/or remote renewable energy sites (solar farms, windfarms, etc.).

In some embodiments, antenna 201 is able to communicate with one or more communication infrastructures (e.g., satellite, cellular, networks (e.g., the Internet), etc.). For example, in some embodiments, antenna 201 is able to communication with satellites 220 (e.g., a GEO satellite) and 221 (e.g., a LEO satellite), cellular network 230 (e.g., an LTE, etc.), as well as network infrastructures (e.g., edge routers, Internet, etc.). For example, in some embodiments, antenna 201 comprises one or more satellite modems (e.g., a GEO modem, a LEO modem, etc.) to enable communication with various satellites such as satellite 220 (e.g., a GEO satellite) and satellite 221 (e.g., a LEO satellite) and one or more cellular modems to communicate with cellular network 230. For another example of an antenna communicating with one or more communication infrastructures, see U.S. patent Ser. No. 16/750,439, entitled "Multiple Aspects of Communication in a Diverse Communication Network", and filed Jan. 23, 2020.

In some embodiments, to facilitate communication with various satellites, antenna 201 performs dynamic beam steering. In such a case, antenna 201 is able to dynamically change the direction of a beam that it generates to facilitate communication with different satellites. In some embodiments, antenna 201 includes multi-beam beam steering that allows antenna 201 to generate two or more beams at the same time, thereby enabling antenna 201 to communication with more than one satellite at the same time. Such functionality is often used when switching between satellites (e.g., performing a handover). For example, in some embodiments, antenna 201 generates and uses a first beam for communicating with satellite 220 and generates a second beam simultaneously to establish communication with satellite 221. After establishing communication with satellite 221, antenna 201 stops generating the first beam to end communication with satellite 220 while switching over to communicate with satellite 221 using the second beam. For more information on multi-beam communication, see U.S. Pat. No. 11,063,661, entitled "Beam Splitting Hand Off Systems Architecture", issued Jul. 13, 2021.

In some embodiments, antenna 201 uses path diversity to enable a communication session that is occurring with one communication path (e.g., satellite, cellular, etc.) to continue during and after a handover with another communication path (e.g., a different satellite, a different cellular system, etc.). For example, if antenna 201 is in communication with satellite 220 and switches to satellite 221 by dynamically changing its beam direction, its session with satellite 220 is combined with the session occurring with satellite 221. Thus, the antennas described herein may be part of a satellite terminal that enables ubiquitous communications and multiple different communication connections.

Dual Beam Antenna Aperture

Figure 3:
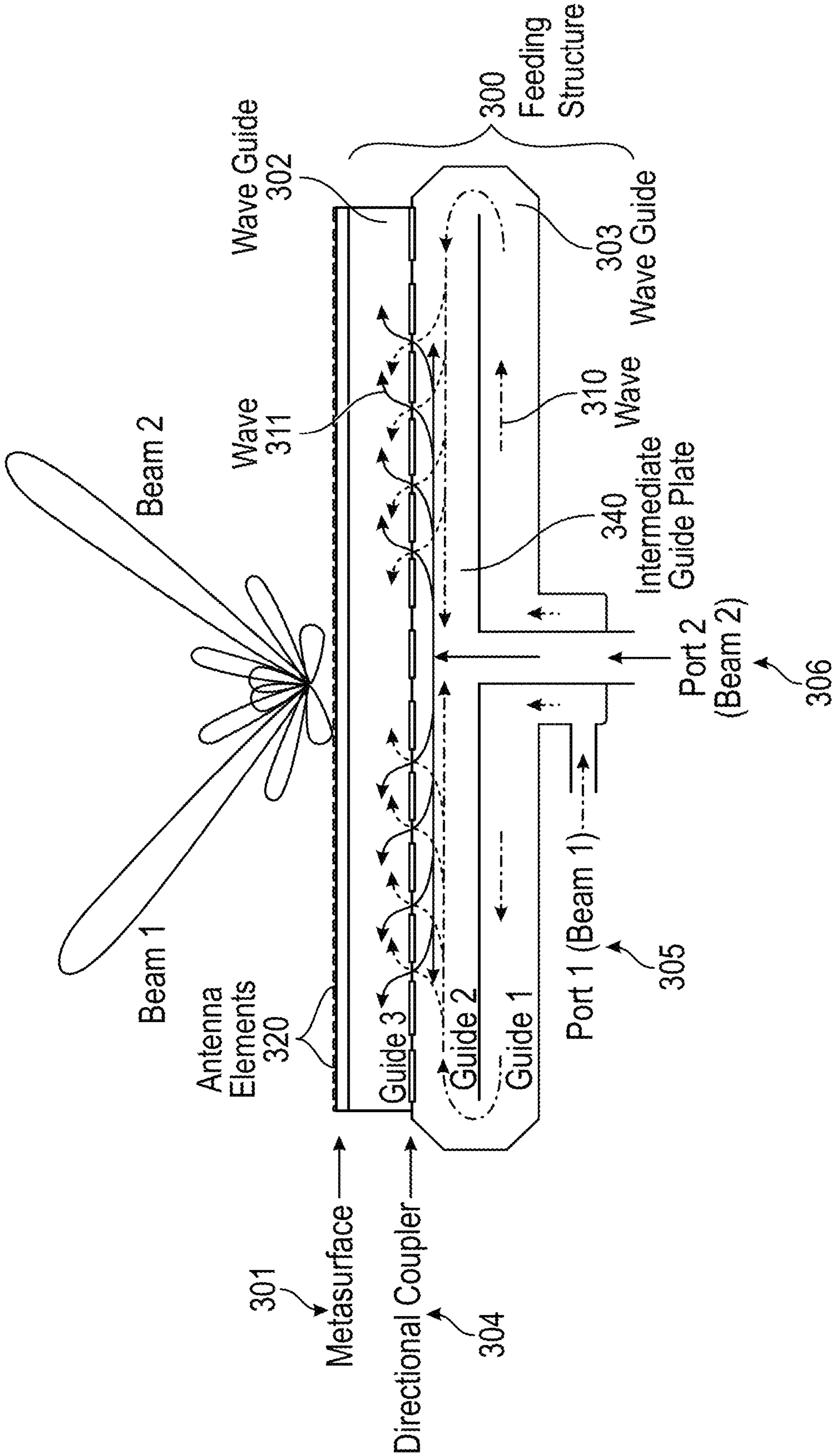
FIG. 3 illustrates a side section view of some embodiments of an antenna with a circular aperture with an array of antenna elements capable of creating two beams simultaneous with arbitrary directions or polarizations.

FIG. 3 illustrates a side section view of some embodiments of an antenna. The antenna can create two simultaneous beams with configurable beam directions and/or polarizations, such that beams with any desired directions and polarizations can be generated. The two beams are generated by the antenna using two feed waves injected into a feeding structure of the antenna which interact with RF radiating antenna elements of the antenna. In some embodiments, the feed waves are TEM feed waves. The two injected feed waves propagate in opposite directions in at least one guide of the feeding structure that is below the antenna elements (which are positioned on the top of the feeding structure) and interact with the antenna elements to create two beams with adjustable directions and polarizations. In some embodiments, two feed waves are initially injected in separate waveguides where they propagate outwardly, and then one of the feed waves is fed (e.g., edge-fed) into the waveguide in which the other feed wave is propagating so that the two feed waves are propagating in the same waveguide in opposite directions.

Referring to FIG. 3, in some embodiments, metasurface 301 with antenna elements 320 is coupled to and over a feeding structure 300. As discussed herein, in some embodiments, antenna elements 320 may include, for example, sub-wavelength radiating slots, RF energy radiating antenna elements (e.g., surface scattering metamaterial (e.g., liquid-crystal (LC)-based antenna elements, varactor-based metamaterial antenna elements, etc.)), etc.

In some embodiments, feeding structure 300 includes three layers of waveguides. The three layers, referred to herein as guides 1-3, are part of waveguides 302 and 303. In some embodiments, feeding structure 300 also includes directional coupler 304 and ports 305 and 306, located, adjacent to, or formed on a rear side of the antenna. Waveguide 302 in some embodiments is coupled to and below metasurface 301. In some embodiments, the waveguide 302 can be coupled to waveguide 303, for example positioned adjacent or top thereof. In some embodiments, the two lower guides 1 and 2 of waveguide 303 are separated by an intermediate guide plate 340. In some embodiments, intermediate guide plate 340 includes a metallic sheet.

In some embodiments, directional coupler 304 is coupled to and separates guides 3 and 2 of waveguides 302 and 303, respectively. Directional coupler 304 operates to provide the waves propagating in guide 3 more uniformly to antenna elements 320 (than if directional coupler 304 was not present). In some embodiments, directional coupler 304 comprises a printed circuit board (PCB) substrate or other type of substrate with copper features on one side and acts to provide feed waves 310 and 311 to antenna elements 320 in a more uniform fashion. In some embodiments, the copper features are holes in the PCB.

In some embodiments, port 305 is connected to and provides a feed wave 310 to guide 1 of waveguide 303, while port 306 is connected to and provides a feed wave 311 to guide 2 of waveguide 303. Note that in some embodiments, feed waves 310 and 311 are radial waves and metasurface 301 and feeding structure 300 are cylindrical (when viewed from the top). By interacting with the waves 310 and 311, antenna elements 320 according to some embodiments generate beam 1 and beam 2. In some embodiments, the distance, or height, of port 305 from guide 1 is selected to reduce, and potentially minimize, reflection that may result from injecting wave 310 into guide 1.

Edge-fed operation of feeding structure 300: In some embodiments, when wave 310 is inserted into port 305, wave 310 couples to guide 1 and travels radially outwards towards the outer edge in the form of a TEM mode. Once wave 310 arrives at the edge, the wave transitions into guide 2 and travels towards the center, and while it's travelling the wave couples power into guide 3 through directional coupler 304. This creates a wave in guide 3 that is travelling towards the center and interacts with antenna elements 320 of metasurface 301 to form a first beam referred to herein as beam 1.

Center-fed operation of feeding structure 300: In some embodiments, when a second wave 311 is inserted into the second port, port 306, wave 311 couples to guide 2 directly at the center of the antenna. Wave 311 travels outwards in guide 2 and while it's traveling it couples power into guide 3 through directional coupler 304. With wave 310 being edge-fed into guide 2 while wave 311 is propagating outwardly in guide 2, waves 310 and 311 travel in opposite directions in guide 2. Like wave 310, wave 311 interacts with antenna elements 320 of metasurface 301 to create a second beam referred to herein as beam 2.

The description provided above for the edge-fed and center-fed operations illustrates the transmit mode. The receive mode operates in a similar manner. Due to the opposite travelling directions of the waves in waveguide 3 a maximum isolation between the two beams can be obtained.

As shown in FIG. 3, the antenna generates two beams simultaneously. In some embodiments, the generation of the two beams occurs by applying modulation to the antenna elements. In some embodiments, the modulation applied to the antenna elements is a combination of the modulations for each of the beams. In some embodiments, the modulation applied to the antenna elements is the average of the required modulations for the creation of each beam, which results in two simultaneous beams being created with the selected directions and/or polarizations.

In some other embodiments, the antenna aperture does not include waveguide 102 and directional coupler 104. In one such case, the array of antenna elements 120 are on top of guide 2 and interact with the feed waves to generate the beams.

Figure 4:
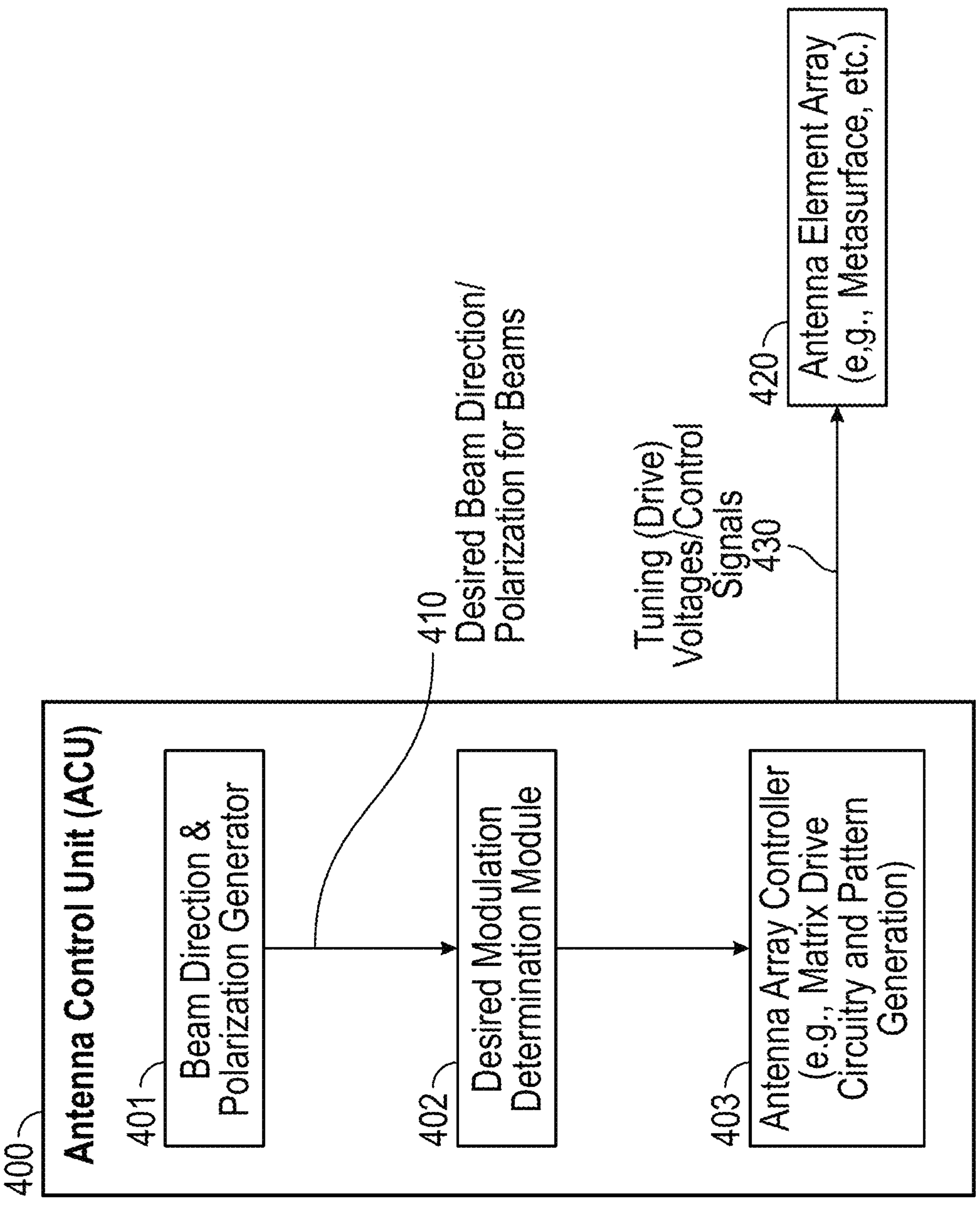
FIG. 4 illustrates some embodiments of an antenna control unit (ACU).

FIG. 4 illustrates some embodiments of an antenna control unit (ACU) that generates the modulation for the array of antenna elements. In some embodiments, the ACU comprises hardware (e.g., circuitry, dedicated logic, etc.), software (e.g., software running on a chip(s) or processor(s), etc.), firmware, or a combination of the three.

Referring to FIG. 4, a beam direction and polarization generator 401 of ACU 400 generates beam directions and polarizations (410) for the two beams and provides these to beam modulation determination module 402. In response, beam modulation determination module 402 generates the modulation for the antenna elements. In some embodiments, beam modulation determination module 402 generates the modulation by determining the modulation for each beam and then combining those two modulations into one modulation by, for example, averaging the two modulations.

An antenna array controller (e.g., matrix drive pattern generator) 403 of ACU 400 generates tuning (drive) voltages and control signals (430) that are sent to antenna elements in array 420 (e.g., antenna elements 320 of metasurface 301 of FIG. 3). Based on the tuning voltages and control signals (430), the antenna elements generate two beams simultaneously.

Figure 5:
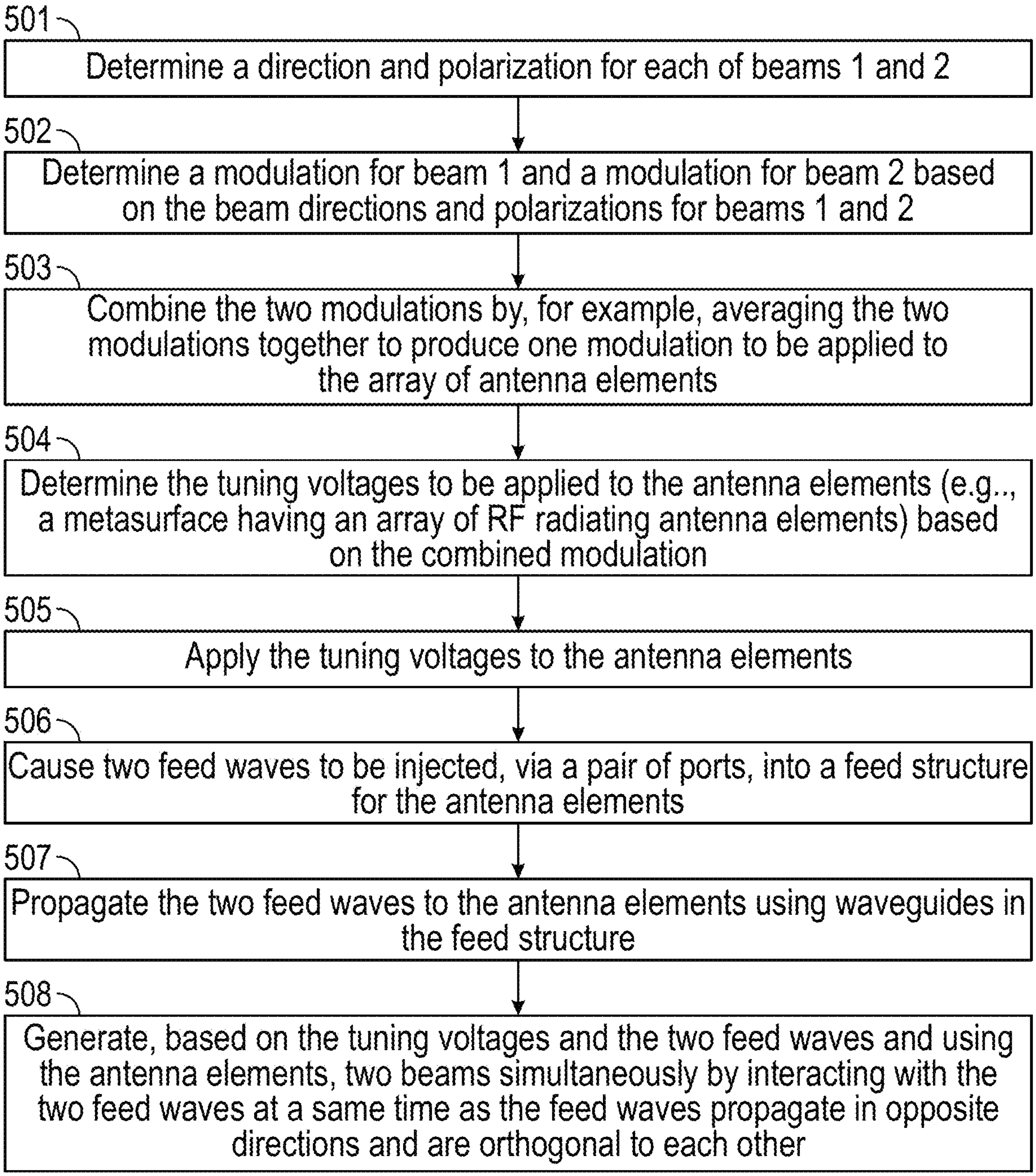
FIG. 5 is a flow diagram illustrating some embodiments of a process for generating two beams simultaneously with one antenna aperture.

FIG. 5 is a flow diagram illustrating some embodiments of a process for generating two beams simultaneously with one antenna aperture have antenna elements. The process is performed by processing logic that comprises hardware (e.g., circuitry, dedicated logic, etc.), software (e.g., software running on a chip(s) or processor(s), etc.), firmware, or a combination of the three.

Referring to FIG. 5, the process begins by processing logic determining a direction and polarization for each of beams 1 and 2 (processing block 501). Based on the beam directions and polarizations for beams 1 and 2, processing logic determines a modulation for beam 1 and a modulation for beam 2 (processing block 502). With the two modulations, processing logic combines them by, for example, averaging the two modulations together to produce one modulation to be applied to the array of antenna elements (processing block 503). Alternatively, processing logic can combine them using geometrical averaging.

Once the combined modulation has been created, processing logic determines the tuning voltages to be applied to the antenna elements (e.g., a metasurface having an array of RF radiating antenna elements) based on the combined modulation (processing block 504). In some embodiments, the process of generating the tuning voltages from the combined modulation comprises applying a Euclidean mapping to map a modulation to achievable modulation states as part of a Euclidean modulation process and then applying the corresponding tuning voltages based on those achievable states. For more information on Euclidean modulation, see U.S. Pat. No. 10,686,636, entitled "Restricted Euclidean modulation", issued Jun. 16, 2020. Once the tuning voltages for the antenna elements have been selected, processing logic applies the tuning voltages to the antenna elements (processing block 505).

Also, as part of the process, processing logic controls two feed waves and causes them to be injected, via a pair of ports, into a feed structure for the antenna elements (processing block 506). The feed waves propagate through the feeding structure using waveguides to reach the antenna elements (507). Based on the tuning voltages and the two feed waves, the antenna elements generate two beams simultaneously by interacting with the two feed waves at a same time (as the feed waves propagate in opposite directions in waveguide 2 and 3) (508).

In some embodiments, the two feed waves that are propagating in opposite directions in the guides (e.g., guides 1 and 2 of FIG. 3) are orthogonal to each other (in terms of the integral of the product of functions over the surface vanishing). This leads to the fact that the two channels are isolated and provides the possibility to use the same aperture for the creation of the two beams. Note that this antenna design technique makes it possible to reuse the same aperture footprint for the creation of the second beam and enable the creation of two beams without sacrificing bandwidth or aperture efficiency.

In some embodiments, the impedance of antenna elements can be tuned to be the average value required for the creation of the first beam and the second beam. Due to the orthonormality of the created waveforms traveling in opposite directions toward the center and the edge of the cylindrical waveguide in the feeding structure and the assigned value of the impedance for the antenna elements, the antenna creates two beams without sacrificing the bandwidth or the aperture efficiency.

Dual Feed Launcher

In some embodiments, the antenna aperture includes a broadband excitation and feeding mechanism having concentric coaxial waveguides to launch TEM waves in parallel plate waveguides sharing a common radial plane arranged in stacked configuration. In some embodiments, the concentric coaxial launcher comprises a dual feed launcher that launches two TEM waves into two stacked parallel plate waveguides sharing common axis and common radial wall. In some embodiments, the concentric coaxial waveguides comprise concentric inner and outer coaxial waveguides and each of these waveguides includes a multi-step cylindrical transition to a parallel plate waveguide. In some embodiments, each of the concentric coaxial waveguides comprises a coaxial-to-parallel plate waveguide transition referred to herein as a multi-step radial transformer. In some embodiments, dimensions of the concentric inner and outer coaxial waveguides are selected so that the design operates without generation of any higher order modes over the operating frequency band. In some other embodiments, dimensions of the concentric inner and outer coaxial waveguides are selected so that there is a good impedance match for both coaxial waveguides over a particular band. The use of the dual feed mechanism enables launching separate and simultaneous TEM waves in two parallel plate waveguides arranged in stacked configuration.

In some embodiments, the concentric coaxial waveguides include center-fed and side port excitation for dual TEM wave launch. In some embodiments, the side port/edge-fed excitation is based on a T-junction power divider with multistep transformer concept and provides very low insertion loss (e.g., less than 0.2 dB) and good impedance matching (at the coaxial input) over large bandwidth (e.g., is −20 dB over a bandwidth of 10-15 GHz). This is in contrast to prior art feed mechanism that is based on capacitive coupling which does not provide good coupling and is narrow band.

In some embodiments, the concentric coaxial line excitation with multistep transformer provides good impedance matching over 10-15 GHz. The concentric coaxial waveguide with center and side fed excitation along with multistep cylindrical transitions excites TEM waves in two parallel plate waveguides having a common radial E-plane (electric field normal to the conductive surface separating the two parallel plates).

Figure 6:
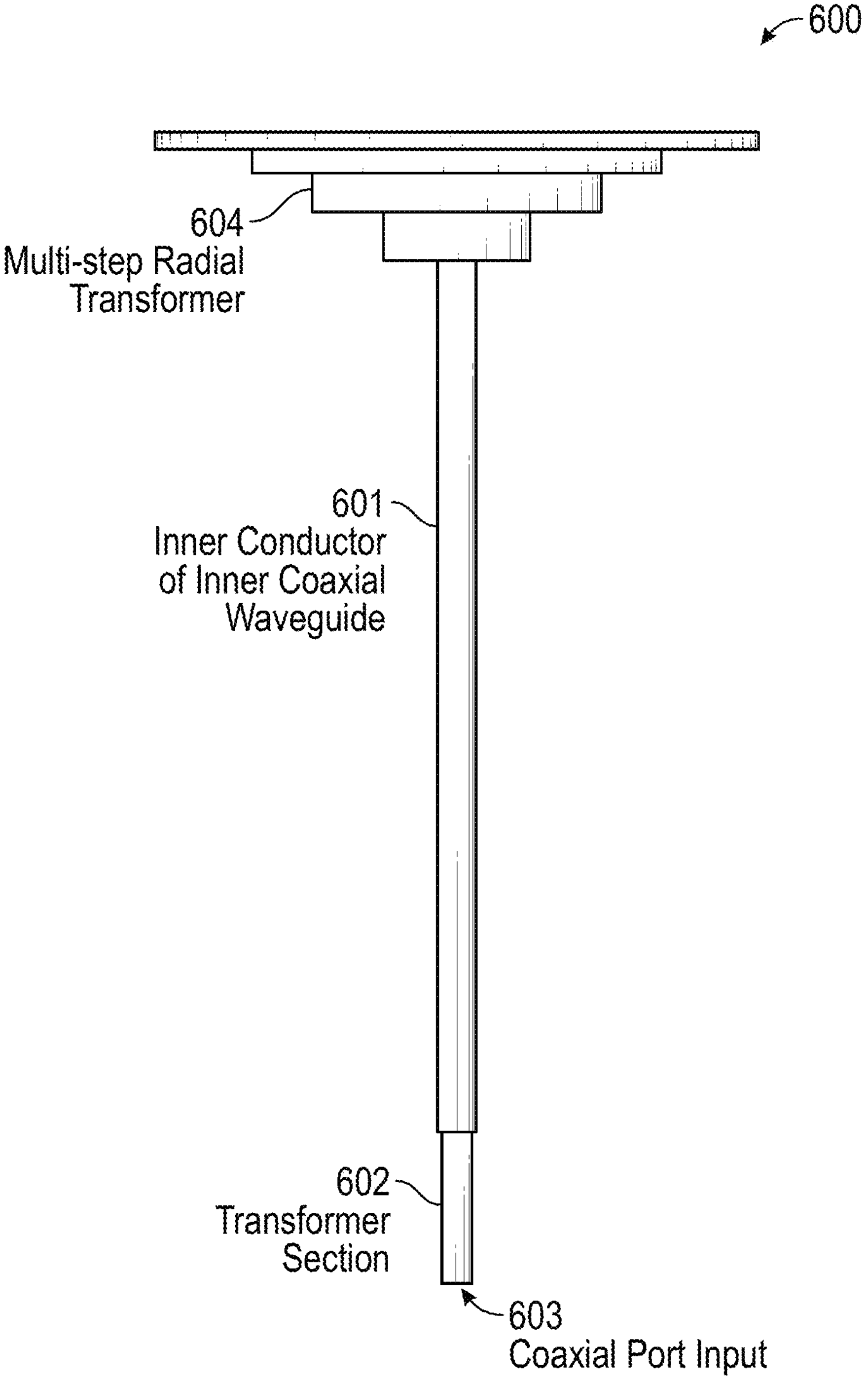
FIG. 6 illustrates some embodiments of an inner coaxial waveguide.

FIG. 6 illustrates some embodiments of an inner coaxial waveguide. Referring to FIG. 6, inner coaxial waveguide 600 comprises a coaxial port input 603 for receiving a TEM wave. Inner coaxial waveguide 600 includes a transformer section 602 coupled to coaxial port input 603 to match coaxial port input 603 to the concentric coaxial line dimensions of inner coaxial waveguide 600. Transformer section 602 is coupled to inner conductor (inner concentric guide) 601. Inner conductor 601 is coupled to multi-step radial transformer 604. In some embodiments, transformer section 602 has a length of approximately a quarter wavelength at a center frequency (e.g., 12.5 GHz) and a width having dimension that lies between the inner conductor of inner coaxial waveguide 601 and coaxial port input 603.

In operation, a TEM wave is fed by a coaxial cable to coaxial port input 603. From the coaxial port input 603, the TEM wave proceeds through transformer section 602 with the inner conductor to multi-step radial transformer 604. At this point, multi-step radial transformer 604 causes the TEM wave to propagate into and through a waveguide (e.g., one of the stacked parallel plate waveguides). In some embodiments, multi-step radial transformer 604 comprises multiple steps, and the TEM wave propagates radially further outward from the center with each step until it reaches the top. In this way, inner coaxial waveguide 600 operates as a multi-step radial transformer.

In some embodiments, multi-step radial transformer 604 has four steps and the steps are thinner and wider as the top of the multi-step radial transformer 604 is reached. The number of steps may be varied (e.g., two steps, four steps, five steps, etc.). Also, during propagation of the TEM wave upward through inner coaxial waveguide 600, the impedance of the inner coaxial waveguide 601 is matched to the parallel plate waveguide using the multi-step radial transformer 604.

Figure 7:
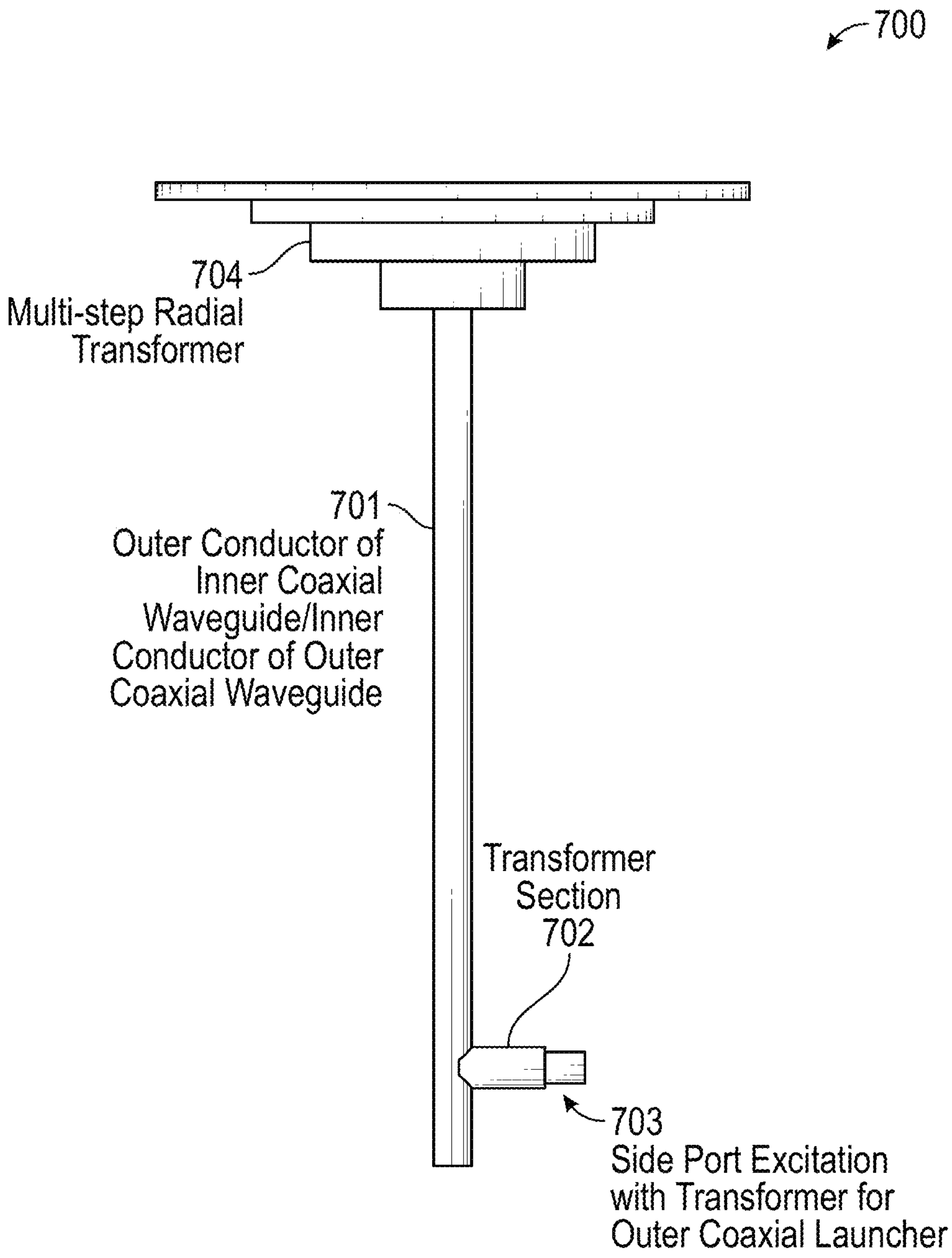
FIG. 7 illustrates some embodiments of an outer coaxial waveguide.

FIG. 7 illustrates some embodiments of an outer coaxial waveguide. Referring to FIG. 7, outer coaxial waveguide 700 comprises a coaxial side port input 703 for receiving a TEM wave and coaxial transformer section 702. Transformer section 702 is used to impedance match coaxial port input port 703 to concentric coaxial line dimensions of outer coaxial waveguide 700. The inner conductor of outer coaxial waveguide 700 acts as outer conductor for inner coaxial waveguide 600, thus resulting in concentric coaxial waveguide structure.

In some embodiments, in operation, a TEM wave is fed by a coaxial cable to coaxial side port input 703 and the side port/edge-fed excitation is based on using a 3-port T-junction power divider with multistep transformer (via transformer 702) to enable the concentric radial propagation of the TEM wave through outer coaxial waveguide 700. The coaxial waveguide T-junction power divider is designed to have one of its output ports terminated with a short to unidirectionally transmit/receive TEM waves along the other output port. From the coaxial port input 703, the TEM wave proceeds through transformer section 702 and through the central conductor to the multi-step radial transformer 704. At this point, multi-step radial transformer 704 causes the TEM wave to propagate into and through a parallel plate waveguide (e.g., one of the stacked parallel plate waveguides). In some embodiments, multi-step radial transformer 704 comprises a multi-step radial transformer which is used to impedance match the coaxial waveguide to the parallel plate waveguide while maintaining the TEM mode.

In some embodiments, multi-step radial transformer 704 has four steps and the steps are thinner and wider as the top of the multi-step radial transformer 704 is reached. The number of steps may be varied (e.g., two steps, four steps, five steps, etc.). Also, during propagation of the TEM wave upward through outer coaxial waveguide 700, the impedance of outer coaxial waveguide 701 is matched to the parallel plate waveguide using multi-step radial transformer 704.

Figure 8A:
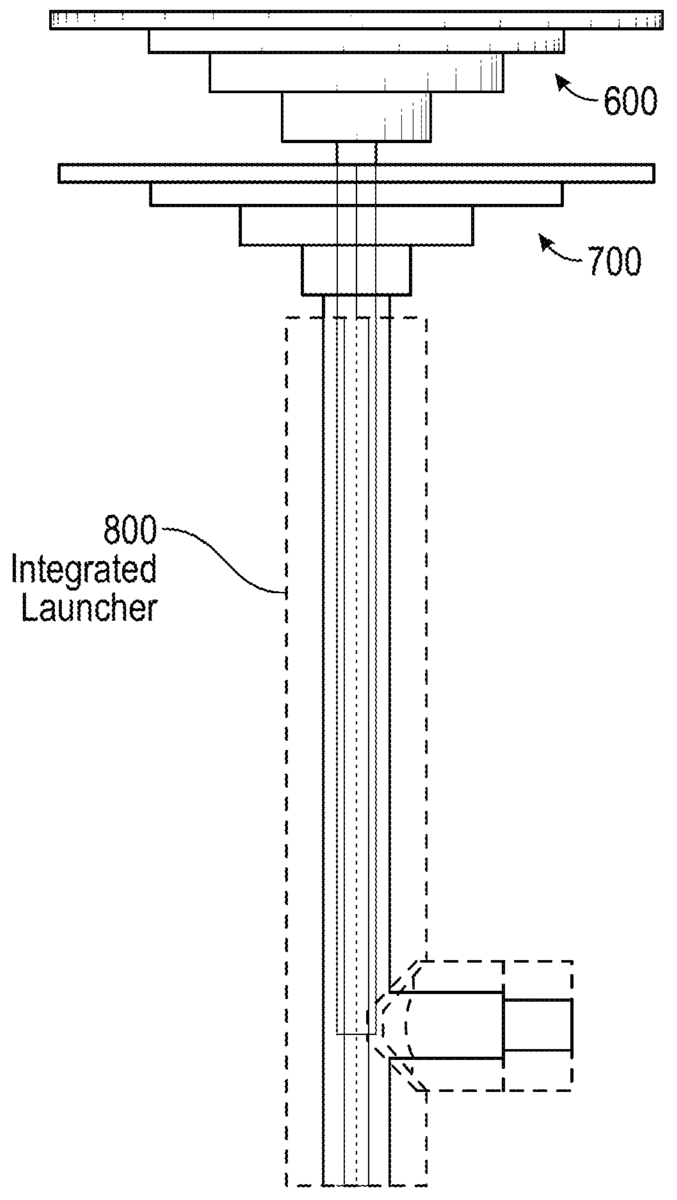
FIG. 8A illustrates some embodiments of an integrated launcher.

FIG. 8A illustrates some embodiments of an integrated launcher. Referring to FIG. 8A, integrated launcher 800 includes an inner coaxial waveguide (e.g., inner coaxial waveguide 600 of FIG. 6) and an outer coaxial waveguide (e.g., outer coaxial waveguide 700 of FIG. 7). By integrating the two waveguides together, integrated launcher 800 is a very compact concentric coaxial waveguide structure.

Figure 8B:
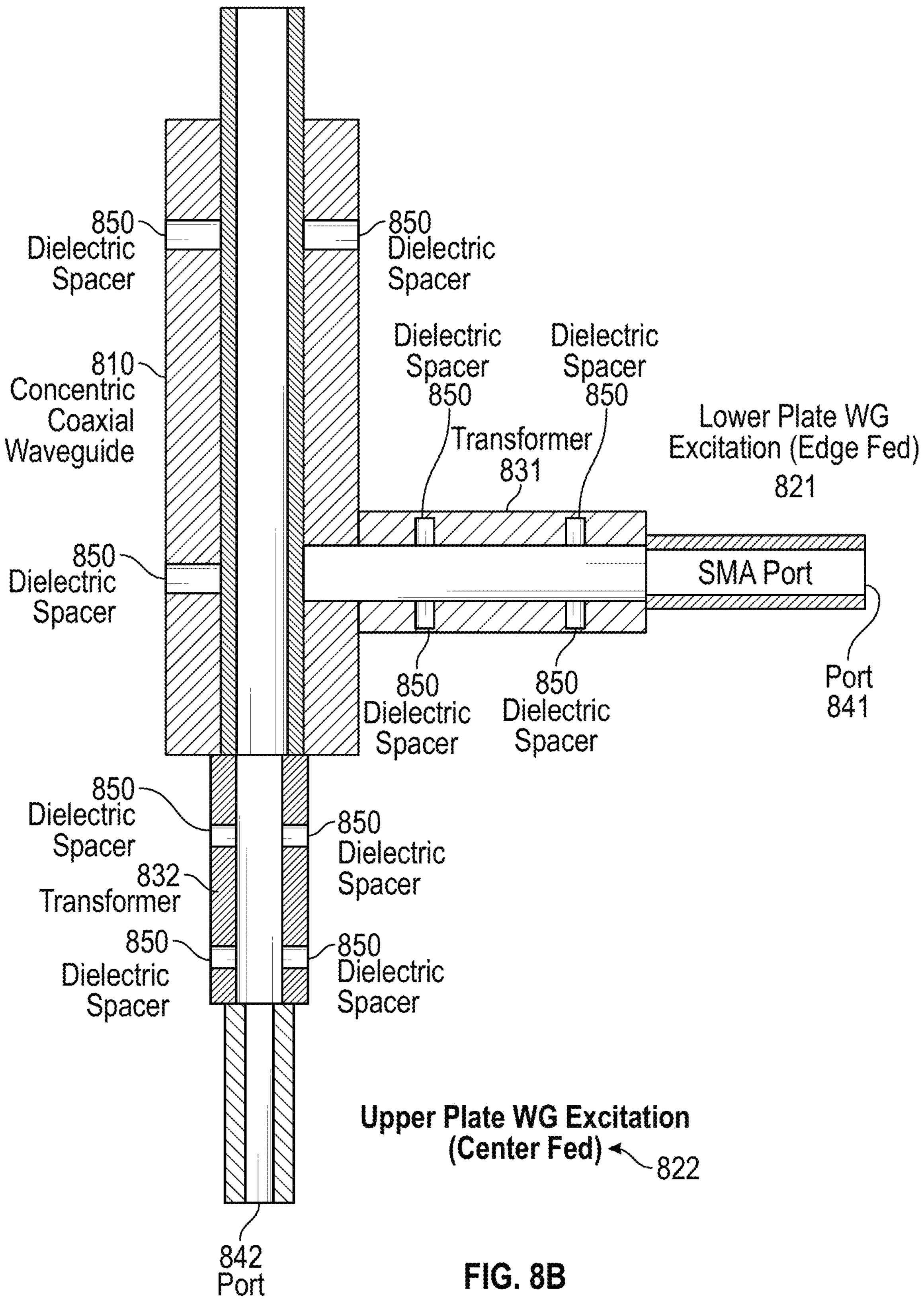
FIG. 8B illustrates some embodiments that includes dielectric spacers between the inner and outer coaxial waveguides.

In some embodiments, spacing between the inner and outer coaxial waveguides are maintained using a dielectric spacer(s). In some embodiments, the dielectric spacer comprises Teflon or some other similar material. FIG. 8B illustrates some embodiments that include dielectric spacers between the inner and outer coaxial waveguides. Referring to FIG. 8B, concentric coaxial waveguide 810 comprises lower plate waveguide (WG) excitation 821 that supplies a TEM wave via SMA (SubMiniature version A) port 841 and transformer 831 to the lower parallel plate waveguide (e.g., guide 1 of FIG. 3) in which the TEM wave propagates to the upper parallel plate waveguide (e.g., guide 2 of FIG. 3) via edge fed propagation. Concentric coaxial waveguide 810 also comprises upper plate waveguide (WG) excitation 822 that supplies a TEM wave via SMA (SubMiniature version A) port 842 and transformer 832 to the upper parallel plate waveguide (e.g., guide 2 of FIG. 3) in which the TEM wave propagates via center fed propagation. Dielectric spacers 850 maintain spacing between the inner and outer coaxial waveguides in concentric coaxial waveguide 810.

During operation, two TEM waves are excited and carried in parallel in integrated launcher 800. In some embodiments, the concentric waveguide comprises inner, middle, and outer conductors. The inner and middle conductor (FIGS. 6 and 7) constitutes the inner coaxial waveguide, while middle and outer conductor constitutes the outer coaxial waveguide (FIG. 8A). In some embodiments, each coax has air as its dielectric. In some embodiments, excitation of the inner coax is done using in-line center fed 2.9 mm coaxial port while the outer coax is excited using side port excitation also 2.9 mm coaxial port. The transformer sections 602 and 702 are used to match the input ports to the concentric coaxial line dimensions. In some embodiments, transformer sections 602 and 702 include one initial step close to the coaxial input that performs an initial transformation, and with the remainder of the inner and outer coaxial waveguides, are used to match the impedance between the concentric coaxial waveguide and the parallel plate waveguides (i.e., multi-step radial impedance matching transformer).

Figure 9:
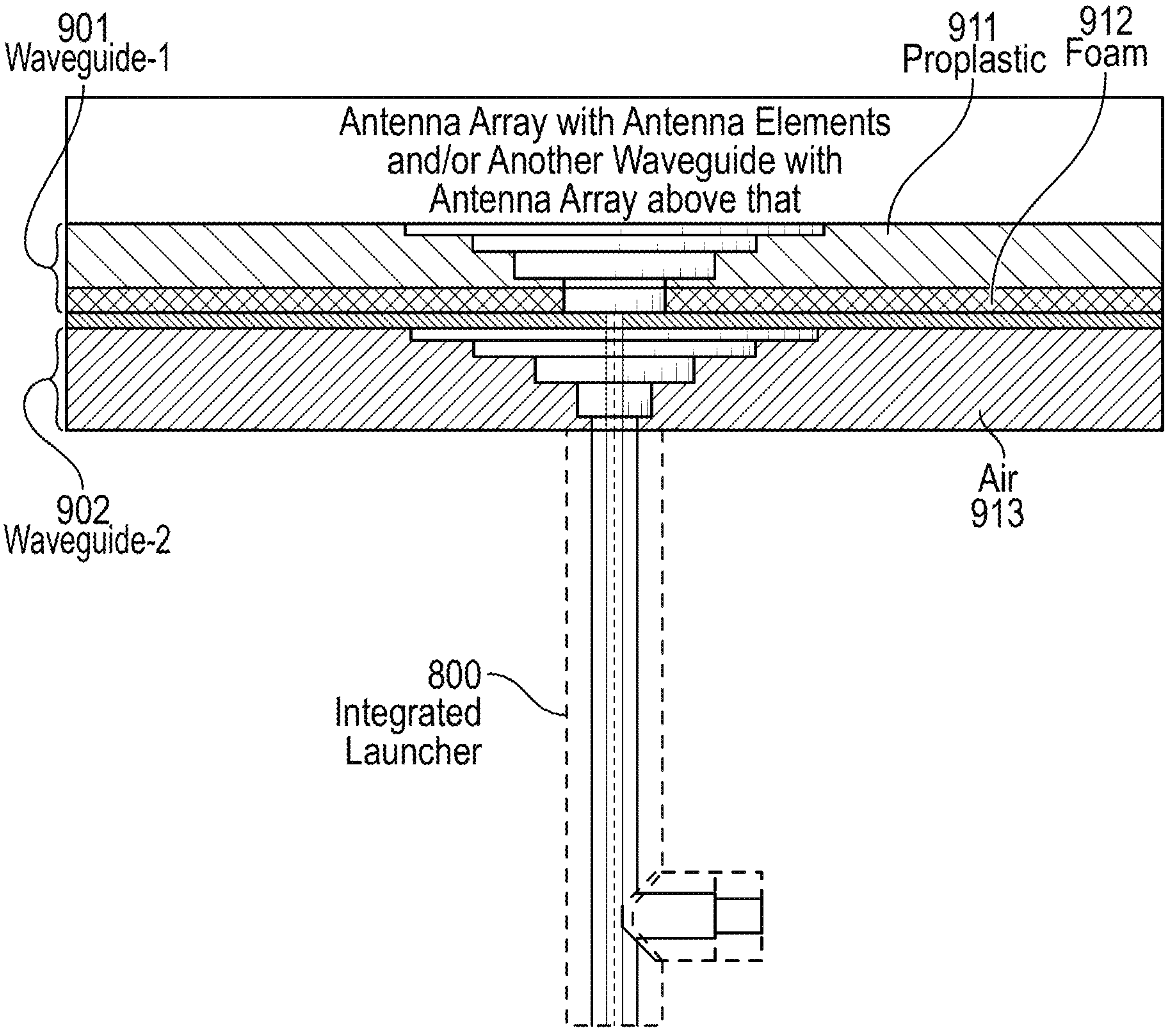
FIG. 9 illustrates some embodiments of an integrated launcher with a parallel plate waveguide.

In some embodiments, each coaxial line couples the TEM mode to the individual parallel plate waveguide through its inner conductor transitioning into a multistep cylindrical transition in parallel plate section. FIG. 9 illustrates some embodiments of an integrated launcher with a parallel plate waveguide. Referring to FIG. 9, integrated launcher 800 feeds two TEM waves to waveguides 901 and 902 that make up the parallel plate waveguides. In some embodiments, the two waveguides 901 and 902 are in a stacked configuration and share a common radial plane.

In some embodiments, in FIG. 9, the wave injected into waveguide 902 by the outer coaxial waveguide of integrated launcher 800 propagates outward and is reflected at its outer edges up into waveguide 901 where it excites antenna elements of an antenna array (not shown) over waveguide 901, while the wave injected into waveguide 901 by the inner coaxial waveguide of integrated launcher 800 propagates outward where it excites antenna elements of an antenna array over waveguide 901. Alternatively, a directional coupler is included over waveguide 901, and an additional top waveguide is over the directional coupler. In such a case, both TEM waves propagate to this top waveguide from waveguide 901 via the directional coupler. Examples of such waveguide and such wave propagation are described in the antenna embodiments described herein.

In some embodiments, waveguides 901 and 902 include dielectric material to control the speed at which the TEM wave(s) propagates within the waveguide. In some embodiments, the dielectric material in waveguide 901 comprises proplastic 911 and foam 912, while the dielectric material is waveguide 902 comprises air 913. Note that the dielectric properties of proplastic 911 and foam 912 combine to provide a specific dielectric constant for waveguide 901. Other materials and material thicknesses may be used alone or together to provide a desired dielectric constant.

Figure 10:
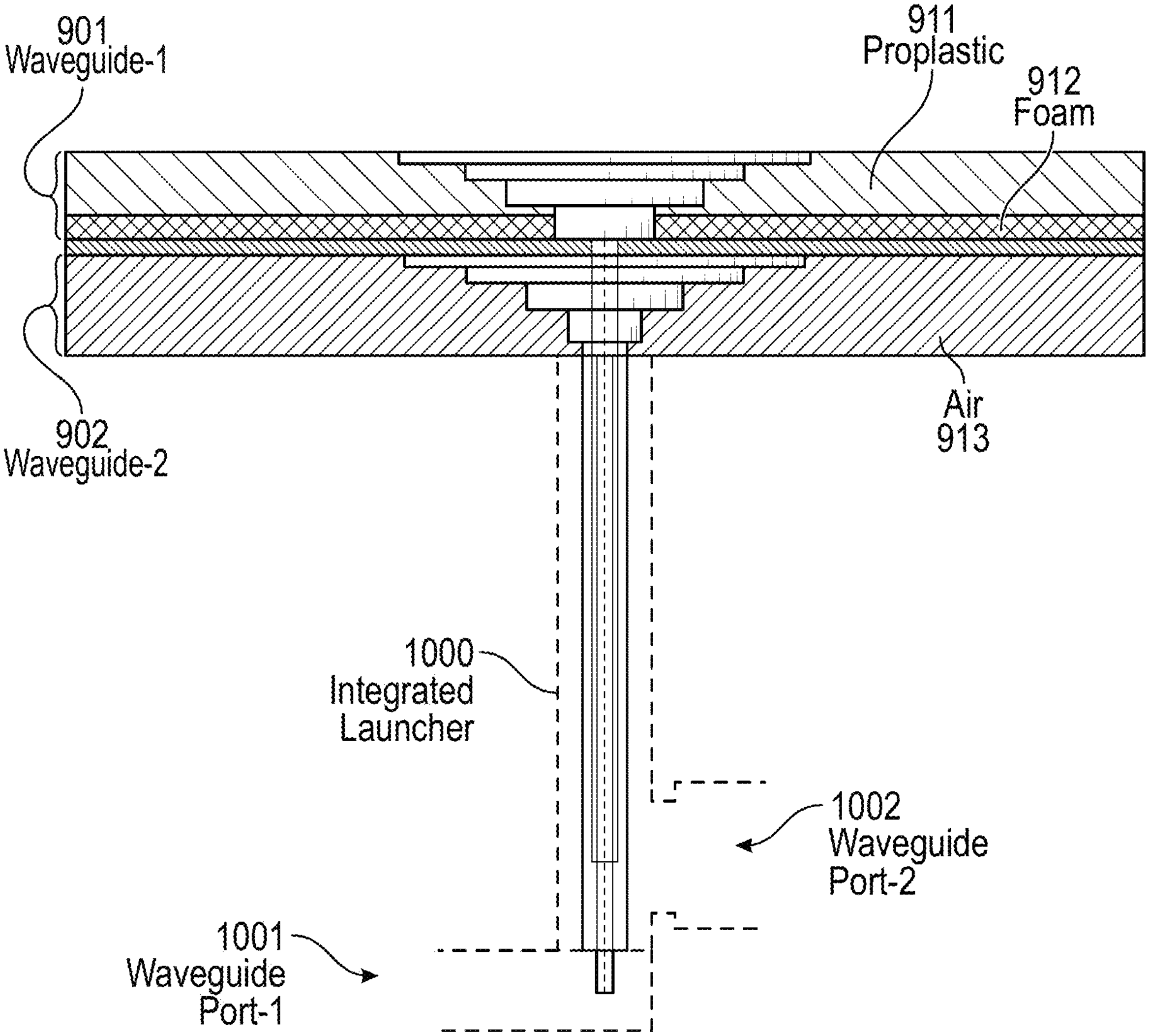
FIG. 10 illustrates multiple waveguide port excitation for use in the integrated launcher.

There are alternatives to embodiments described herein. For example, FIG. 10 illustrates waveguide port excitation that may be used instead of coaxial port. This arrangement will have narrow band performance and will occupy more volume, thus impacting the compact characteristic feature of the design. Referring to FIG. 10, integrated launcher 1000 provides two TEM waves to the parallel plate waveguides 901 and 902. The two TEM waves are input to integrated launcher 1000 by waveguide ports 1001 and 1002.

Thus, embodiments describe herein include an integrated launcher. The integrated launcher is an enabling factor for antenna to support two concurrent beams. The dual beam capability may be used in a variety of settings, including, for example, connecting to a LEO and GEO constellations concurrently.

There are a number of example embodiments described herein.

Example 1 is an antenna comprising: an array of antenna elements; two parallel plate waveguides coupled to the array of antenna elements, the two parallel plate waveguides sharing a common radial plane and arranged in a stacked configuration; and a dual feed launcher to launch first and second TEM waves into the two parallel plate waveguides, the first and second TEM waves being different and being simultaneously launched in the two parallel plate waveguides.

Example 2 is the antenna of example 1 that may optionally include that the dual feed launcher comprises a concentric coaxial launcher having an inner concentric coaxial waveguide and an outer concentric coaxial waveguide.

Example 3 is the antenna of example 2 that may optionally include that the inner concentric coaxial waveguide uses center-fed excitation to receive the first TEM wave from a first coaxial input and the outer concentric coaxial waveguide uses side-fed excitation to receive the second TEM wave from a second coaxial input when launching the first and second TEM waves into the two parallel plate waveguides.

Example 4 is the antenna of example 2 that may optionally include that each of the inner and outer concentric coaxial waveguides includes a coaxial input port and a coaxial to parallel plate waveguide transition, at least one parallel plate waveguide transition being a multi-step cylindrical transition.

Example 5 is the antenna of example 4 that may optionally include that at least one of the inner and outer concentric coaxial waveguides comprises a transformer section to match inner ports of the inner and outer concentric coaxial waveguides to concentric coaxial line dimensions.

Example 6 is the antenna of example 2 that may optionally include that spacing between the inner and outer concentric coaxial waveguides is maintained by one or more dielectric spacers.

Example 7 is the antenna of example 6 that may optionally include that one or more dielectric spacers comprise Teflon spacers.

Example 8 is the antenna of example 1 that may optionally include the array of antenna elements comprises an array of radio-frequency (RF) radiating antenna elements operable to generate two beams simultaneously in response to interacting with the first and second TEM waves; and wherein a first of the two parallel plate waveguides that is between the RF radiating antenna elements and a second of the two parallel plate waveguides propagates the first and second TEM waves in opposite directions.

Example 9 is the antenna of example 8 that may optionally include that the array of antenna elements is part of a metasurface.

Example 10 is the antenna of example 8 that may optionally include that the array of antenna elements is operable to receive and transmit simultaneously on the two beams.

Example 11 is an antenna comprising: an array of antenna elements; a first waveguide coupled to the array of antenna elements; two parallel plate waveguides coupled to the first waveguide, the two parallel plate waveguides sharing a common radial plane and arranged in a stacked configuration, where a first waveguide of the two parallel plate waveguides is center-fed with a first TEM wave that propagates outward and a second waveguide of the two parallel plate waveguides is fed with a second TEM wave that propagates outward and becomes edge-fed into the first waveguide where the first and second TEM waves propagate in opposite directions; and a dual feed launcher to launch the first and second TEM waves into the two parallel plate waveguides, the first and second TEM waves being different and being simultaneously launched in the two parallel plate waveguides, wherein the dual feed launcher comprises a concentric coaxial launcher having an inner concentric coaxial waveguide and an outer concentric coaxial waveguide.

Example 12 is the antenna of example 11 that may optionally include that the inner concentric coaxial waveguide uses center-fed excitation to receive the first TEM wave from a first coaxial input and the outer concentric coaxial waveguide uses side-fed excitation to receive the second TEM wave from a second coaxial input when launching the first and second TEM waves into the two parallel plate waveguides.

Example 13 is the antenna of example 12 that may optionally include that each of the inner and outer concentric coaxial waveguides includes a coaxial input port and a coaxial to parallel plate waveguide transition, at least one parallel plate waveguide transition being a multi-step cylindrical transition.

Example 14 is the antenna of example 13 that may optionally include that at least one of the inner and outer concentric coaxial waveguides comprises a transformer section to match the coaxial inner port of the inner and outer concentric coaxial waveguides to concentric coaxial line dimensions.

Example 15 is the antenna of example 12 that may optionally include that spacing between the inner and outer concentric coaxial waveguides is maintained by one or more dielectric spacers.

Example 16 is the antenna of example 15 that may optionally include that one or more dielectric spacers comprise Teflon spacers.

Example 17 is the antenna of example 11 that may optionally include that the array of antenna elements comprises an array of radio-frequency (RF) radiating antenna elements operable to generate two beams simultaneously in response to interacting with the first and second TEM waves.

Example 18 is a method comprising: inputting first and second TEM waves into a concentric coaxial launcher having an inner concentric coaxial waveguide and an outer concentric coaxial waveguide; injecting the first and second feed waves into two parallel plate waveguides using the concentric coaxial launcher with a coaxial to parallel plate multi-step cylindrical waveguide transition of each of the inner and outer concentric coaxial waveguides; propagating the first and second TEM waves to a metasurface having an array of radio-frequency (RF) radiating antenna elements using the two parallel plate waveguides; and generating one or more beams in response to the first and second TEM waves interacting with the radiating antenna elements of the metasurface.

Example 19 is the method of example 18 that may optionally include that inputting first and second TEM waves into a concentric coaxial launcher having an inner concentric coaxial waveguide and an outer concentric coaxial waveguide comprises providing the first TEM wave to the inner concentric coaxial waveguide via center-fed excitation and providing the second TEM wave to the outer concentric coaxial waveguide via side-fed excitation.

Example 20 is the antenna of example 18 that may optionally include that generating one or more beams comprises generating two beams simultaneously by interacting with the first and second TEM waves at a same time as the first and second TEM waves propagate in opposite directions and are orthogonal to each other.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

We claim:

1. An antenna comprising:

an array of antenna elements;

a directional coupler;

a first waveguide having a first side coupled to the array of antenna elements and a second side coupled to the directional coupler;

two parallel plate waveguides coupled to the first waveguide via the directional coupler, the two parallel plate waveguides sharing a common radial plane and arranged in a stacked configuration; and a dual feed launcher to launch first and second TEM waves into the two parallel plate waveguides, the first and second TEM waves being different and being simultaneously launched in the two parallel plate waveguides, the directional coupler to couple the first and second TEM waves into the first waveguide for propagation to the array of antenna elements.

2. The antenna of claim 1 wherein the dual feed launcher comprises a concentric coaxial launcher having an inner concentric coaxial waveguide and an outer concentric coaxial waveguide.

3. The antenna of claim 2 wherein the inner concentric coaxial waveguide uses center-fed excitation to receive the first TEM wave from a first coaxial input and the outer concentric coaxial waveguide uses side-fed excitation to receive the second TEM wave from a second coaxial input when launching the first and second TEM waves in the two parallel plate waveguides.

4. The antenna of claim 2 wherein each of the inner and outer concentric coaxial waveguides includes a coaxial input port and a coaxial to parallel plate waveguide transition, at least one parallel plate waveguide transition being a multi-step cylindrical transition.

5. The antenna of claim 4 wherein at least one of the inner and outer concentric coaxial waveguides comprises a transformer section to match inner ports of the inner and outer concentric coaxial waveguides to concentric coaxial line dimensions.

6. The antenna of claim 2 wherein one or more dielectric spacers maintain spacing within a structure containing the inner and outer concentric coaxial waveguides.

7. The antenna of claim 6 wherein one or more dielectric spacers comprise Polytetrafluoroethylene spacers.

8. The antenna of claim 1 wherein the array of antenna elements comprises an array of radio-frequency (RF) radiating antenna elements operable to generate two beams simultaneously in response to interacting with the first and second TEM waves; and wherein a first of the two parallel plate waveguides that is between the RF radiating antenna elements and a second of the two parallel plate waveguides propagates the first and second TEM waves in opposite directions.

9. The antenna of claim 8 wherein the array of antenna elements is part of a metasurface.

10. The antenna of claim 8 wherein the array of antenna elements is operable to receive and transmit simultaneously on the two beams.

11. An antenna comprising:

an array of antenna elements;

a first waveguide coupled to the array of antenna elements;

two parallel plate waveguides coupled to the first waveguide, the two parallel plate waveguides sharing a common radial plane and arranged in a stacked configuration, a first waveguide of the two parallel plate waveguides being center-fed with a first TEM wave that propagates outward and a second waveguide of the two parallel plate waveguides being fed with a second TEM wave that propagates outward and becomes edge-fed into the first waveguide of the two parallel plate waveguides where the first and second TEM waves propagate in opposite directions; and a dual feed launcher to launch the first and second TEM waves into two parallel plate waveguides, the first and second TEM waves being different and being simultaneously launched into the two parallel plate waveguides, wherein the dual feed launcher comprises a concentric coaxial launcher having an inner concentric coaxial waveguide and an outer concentric coaxial waveguide.

12. The antenna of claim 11 wherein the inner concentric coaxial waveguide uses center-fed excitation to receive the first TEM wave from a first coaxial input and the outer concentric coaxial waveguide uses side-fed excitation to receive the second TEM wave from a second coaxial input when launching the first and second TEM waves into the two parallel plate waveguides.

13. The antenna of claim 12 wherein each of the inner and outer concentric coaxial waveguides includes a coaxial input port and a coaxial to parallel plate waveguide transition, at least one parallel plate waveguide transition being a multi-step cylindrical transition.

14. The antenna of claim 13 wherein at least one of the inner and outer concentric coaxial waveguides comprises a transformer section to match a coaxial inner port of the inner and outer concentric coaxial waveguides to concentric coaxial line dimensions.

15. The antenna of claim 12 wherein one or more dielectric spacers maintain spacing within a structure containing the inner and outer concentric coaxial waveguides.

16. The antenna of claim 15 wherein one or more dielectric spacers comprise Polytetrafluoroethylene spacers.

17. The antenna of claim 11 wherein the array of antenna elements comprises an array of radio-frequency (RF) radiating antenna elements operable to generate two beams simultaneously in response to interacting with the first and second TEM waves.

18. A method comprising:

inputting first and second TEM waves into a concentric coaxial launcher having an inner concentric coaxial waveguide and an outer concentric coaxial waveguide;

injecting the first and second TEM waves into two parallel plate waveguides using the concentric coaxial launcher with a coaxial to parallel plate multi-step cylindrical waveguide transition of each of the inner and outer concentric coaxial waveguides;

propagating the first and second TEM waves to a first waveguide via a directional coupler;

propagating, via the first waveguide, the first and second TEM waves to a metasurface having an array of radio-frequency (RF) radiating antenna elements using the two parallel plate waveguides; and generating one or more beams in response to the first and second TEM waves interacting with the radiating antenna elements of the metasurface.

19. The method of claim 18 wherein inputting first and second TEM waves into a concentric coaxial launcher having an inner concentric coaxial waveguide and an outer concentric coaxial waveguide comprises providing the first TEM wave to the inner concentric coaxial waveguide via center-fed excitation and providing the second TEM wave to the outer concentric coaxial waveguide via side-fed excitation.

20. The method of claim 18 wherein generating one or more beams comprises generating two beams simultaneously by interacting with the first and second TEM waves at a same time as the first and second TEM waves propagate in opposite directions and are orthogonal to each other.

* * * * *